United States Patent Office 3,514,294
Patented May 26, 1970

3,514,294
METHOD FOR PRODUCING FRIED
COATED COMESTIBLES
Sigmund L. Klug, Bronx, N.Y., Gilbert Finkel, South
Amboy, N.J., and Monroe Sherain, Brooklyn, N.Y.,
assignors to DCA Food Industries, Inc., New York,
N.Y.
No Drawing. Filed May 26, 1966, Ser. No. 553,026
Int. Cl. A23l 1/00
U.S. Cl. 99—1                                      7 Claims

ABSTRACT OF THE DISCLOSURE

A foodstuff is prepared for frying by successively alternately applying to the foodstuff dry powder coatings and batter coatings. Each coating contains 60 to 90 parts starch, 1 to 9 parts leavening, 1 to 15 parts sugar and 1 to 15 parts salt, the batter containing, in addition, 85% to 200% water based on the weight of the dry ingredients. The coatings may contain additives such as dry milk solids. Synergism exists at ratios of 1 to 8 parts sugar to 2 to 12 parts salt, 2 to 12 parts salt to 1 to 4 parts leavening, and 1 to 8 parts sugar to 1 to 4 parts leavening.

---

The present invention relates generally to an improvement in the preparation of comestibles. In particular, it relates to an improved and novel composition and process for the preparation of coated comestibles attendant the frying thereof.

It is conventional in the frying of foodstuffs, either by deep fat frying or by frying in shallow oil of such foodstuffs as meat, fish, fruit or vegetables, preliminarily to coat the foodstuff with a batter and a breading material which may or may not have been precooked. The procedure usually involves the initial coating of the foodstuff with a liquid batter of an adhesive nature and then applying a particulate farinaceous material to the batter-covered surface. The coated product is then either fried, or frozen and stored to be fried at a later date. An alternative method involves the dipping or immersion of the substrate food product in a highly viscous batter and directly frying the so-coated food product with no application of any particulate farinaceous material. Where the food substrate is coated only with a breading material before the frying thereof the textural character of the resulting product is usually of an undesirable nature, having inferior eating qualities. The breading materials are extremely dry and hard and upon frying usually become much harder. Furthermore, large quantities of the breading material are consumed upon the reheating of prefried and frozen products. Another drawback to this type of treatment is that after being subjected to the steps of pre-frying freezing, storing and frying, the breading either becomes soft and soggy or becomes exceedingly hard and lacking in crispness. Where the foodstuff is merely battered and fried, large quantities of fat are absorbed during frying and if the fried food is consumed immediately after frying it is highly distasteful and difficult of digestion as a result of such high fat concentration. On the other hand, if the fried food is reheated after the pre-frying, freezing and storage thereof, the excess fat absorbed during the frying step is rendered. In addition, where the food substrate is only covered with batter, an insufficient amount of batter adheres to the food substrate thereby rendering this procedure economically impractical. A batter pick-up in excess of 50% of the total weight of the fried batter is required and a pick-up in excess of 60% of the fried batter is desirable. However, batter pick-up of this degree with the use of conventional batters is impossible since such a batter would have a viscosity which renders it unworkable.

It is, therefore, a principal object of the present invention to provide an improved process for the preparation of comestibles and a composition for use therewith.

Another object of the present invention is to provide an improved composition and process for the preparation of fired foodstuff and the resulting products.

Still another object of the present invention is to provide an improved composition and process for the coating of food substrate attendant the subsequent cooking thereof and the resulting product.

A further object of the present invention is to provide a process of the above nature characterized by its uniformity, efficiency, versatility and adaptability.

The above and other objects of the present invention will become apparent from a reading of the following description which sets forth preferred embodiments and is not intended to limit the scope thereof.

The present invention, in a sense, is based on the discovery that a greatly superior fried comestible is produced, one which overcomes the many drawbacks and disadvantages of the conventionally fried comestible, and that an improved process is achieved by the present unique procedure in coating a food substrate attendant the frying thereof with the novel composition. The coating is effected by applying to the food substrate a first powder coating containing starch in a major amount and a sugar, salt and leavening in a minor amount, then applying to the powder coated food substrate a first batter coating comprising water and, as the originally dry ingredients thereof, a major amount of starch and minor amounts of sugar, salt and leavening, then applying a second powder coating of the nature of the first powder coating and then a second batter of the nature of the first batter. The first and second powder coating may be of identical composition as may be the first and second batters. Moreover, the dry ingredients of the batter may be the same as those of the powder coating. In addition to the above ingredients the powder and the batter may contain other materials as, for example, whey and nonfat dry milk.

The powder coating material advantageously contains between 60 and 90 parts of starch, at least one and up to 15 parts of sugar (sucrose), at least one and up to 15 parts of salt, and between one and 9 parts of leavening. The batter contains the above powder ingredients in the ranges set forth and between 85% and 200% water based on the weight of the dry ingredients. The various proportions noted are given by weight.

It has been discovered further that a synergism is experienced in relationship to fat absorption, crispness and color, a low fat absorption, high crispness and optimum color resulting when, in a batter containing starch, sugar, salt, leavening and water, the ratio of sugar to salt is between 1 to 8 parts of sugar to 2 to 12 parts of salt, the ratio of salt to leavening being between 2 to 12 parts of salt to 1 to 9 parts of leavening, and the ratio of sugar to leavening being between 1 to 8 parts of sugar to 1 to 4 parts of leavening. It is important to note that the effect of the individual components of a combination on a particular characteristic is radically less outside the ratio or in the absence of the other component than when in the respective combination within the said ratio.

The starch is advantageously present in the form of a flour, preferably a mixture of wheat flour and corn flour. A small percentage of the starch is preferably gelatinized, that is up to 5% of the starch content. Thus the following is the preferred range of ingredients of the coating powder:

| Ingredient: | Parts by weight |
|---|---|
| Wheat flour | 40 to 50 |
| Corn flour | 30 to 40 |
| Gelatinized flour | .25 to 2.5 |
| Sugar (sucrose) | 6 to 9 |
| Leavening | 1 to 4 |

In addition to the above, other edible ingredients may be present, for example, none and up to 5 parts of whey or nonfat dry milk, none and up to 3 parts of dried egg, and none and up to 5 parts of monosodium glutamate, and other additives.

The batter is a mixture of the dry ingredients within the ranges set forth above, including the flour, sugar, salt and leavening and the other desired additives and between 85% and 200% of water based on the weight of the dry ingredients. The composition of the dry ingredients of the batter may be the same as the composition of the coating powder. The batter is produced from the water and dry ingredients in any conventional manner.

The following is a specific example of the coating powder:

EXAMPLE I

| Ingredient | Pounds | Ounces |
|---|---|---|
| Wheat flour | 46 | 2 |
| Corn flour | 34 | 5 |
| Gelatinized corn flour | 0 | 7 |
| Sugar | 7 | 14 |
| Nonfat dry milk | 1 | 13 |
| Salt | 5 | 12 |
| Leavening | 3 | 11 |

The batter is produced by mixing the powdered ingredients of Example I with 140% by weight of water.

In preparing the comestible in accordance with the present invention, a food substrate such as a fish stick, is coated with a first layer of the dry powder by rolling the food substrate in the powder or by dusting same thereon. The powder-coated food substrate is then dipped into the batter, or the batter is applied by means of a batter curtain, to form a first batter layer overlying the first powder layer. A second powder layer is then applied overlying the first batter layer, and a second batter layer is applied overlying the second powder layer. The food substrate coated as above, may then be fired, either by full immersion or partial immersion in hot frying oil in the usual manner and is ready for consumption, or the thus fried product may be frozen and stored for future use. In preparing the frozen product for consumption it may be reheated in any convenient manner.

The present method is highly efficient and subject to easy process control and to numerous variations which permits a wide range of adjustment of many of the properties of the end product. The resulting comestible is of great uniformity and possesses characteristics of highly unexpected nature and superior to corresponding comestible produced in accordance with the present process is neither soggy, soft nor gritty but is provided with a crisp envelope and possesses an unusually good and pleasing flavor, whether consumed immediately after frying or following the reheating of the fried, frozen and stored product. The coated comestible exhibits an unexpectedly low fat absorption attendant the frying thereof and no rendering of the fat occurs during the reheating of the previously fried product, nor does the product stick to the reheating vessel, a drawback which characterizes the conventionally coated and fried products. Furthermore, the flake-off which is normally experienced in the frying of conventional coated comestibles is minimized and the end product is of relatively greater volume by reason of the high expansion of the coating during the frying operation. With the present coating procedure, the coated comestible need not be submerged during the frying operation and excessive amounts of water are not evaporated from the coated comestible during frying. In normal procedures, crispness of the coating as effected by the frying operation is a function of the dehydration thereof, which quite unexpectedly is not the case in the present process. Moreover, in the present process, the batter pick-up is controlled only incidentally by the viscosity of the batter but primarily by the use of the batter mix powdered solids as an undercoating prior to the application of the batter thereby to permit the use of an easily workable low viscosity batter. Furthermore, by employing two successive sets of powdered solid and batter coatings, a greatly increased and improved puffing is experienced during the frying operation.

It has also been discovered that, with the present method, the character of the coating may be varied within wide ranges as to fat absorption, crispness and color by adjusting the relative proportions of sugar, leavening and salt. Specifically, the fat absorption of the coating during the frying operation is controlled almost exclusively by the salt level in the dry mix, the greater the amount of salt the less the amount of fat absorption and the less the amount of salt the greater the amount of fat absorption. It has further been found that while both sugar and leavening contribute to the crispness of the fried product, there is an interaction between the sugar and leavening which is more effective in the control of crispness than occurs with either of these ingredients individually. In addition, increases in the amount of salt in the dry ingredients contributes to an increase in the crispness. Moreover, it has been found that there is an interaction between the salt level and the leavening level which effects the crispness to a much greater degree than either level individually. Further, the level of the salt plays a significant role in color development during the frying and there is an interaction between the sugar and salt which tends to inhibit and prevent color development during the frying period. Additionally, it has been discovered that there is no significant relationship between water loss during frying and fat absorption during frying.

A wide range of adjustment of the characteristics and properties of the present coating may be effected by varying the relative proportions and amounts of salt, sugar and leavening. Thus, by way of illustration, the coating produced by the use of the dry powder mix and batter of Example I set forth above may be modified in the following manner by the respective modifications of the dry ingredients in the powder coating and batter:

EXAMPLE II

The ingredients and proportions are the same as set forth in Example I above except as follows:

| Ingredient | Pounds | Ounces |
|---|---|---|
| Sugar | 9 | 10 |
| Soda | 2 | 1½ |
| Sodium Aluminum phosphate | 2 | 2½ |

The resulting coating possessed a greater crispness than that of Example I.

EXAMPLE III

The ingredients and proportions are the same as Example I except as follows:

| Ingredient | Pounds | Ounces |
|---|---|---|
| Sugar | 10 | 6 |
| Salt | 7 | 15 |

The resulting coating developed less color than that of Example I.

EXAMPLE IV

The ingredients and proportions are the same as Example I except as follows:

| Ingredient | Pounds | Ounces |
|---|---|---|
| Salt | 9 | 8 |

The resulting coating possessed a lower fat absorption than that of Example I.

By modifying the ratio of the corn flour, wheat flour and leavening (soda and sodium aluminum phosphate) in Example I to 58% of corn flour, 22% of wheat flour and 3.78% of leavening, the coated product need not be submerged during frying. The same effect may be achieved by modifying the ratio of leavening and gelatinized corn flour in Example I to 3.78% of leavening and 0.7% of gelatinized corn flour.

While there have been described preferred embodiments of the present invention, it is apparent that numerous alterations, omissions and additions may be made without departing from the spirit thereof. It should be noted that the present method and composition may be applied to different food substrates, as above noted, that is fish, meat, vegetable, fruit, etc. Moreover, although successive pairs of dry and batter coatings are applied to the food substrate to great advantage, a single pair of such coatings, first the dry powder coating and then the batter coating may be employed.

What is claimed is:

1. The method of producing a coated comestible intended for subsequent cooking including the steps of applying to a food substrate a coating of a relatively dry powder comprising 60 to 90 parts starch, 1 to 9 parts leavening, 1 to 15 parts sugar and 1 to 15 parts salt, and thereafter applying to said powder coated substrate a coating of a batter comprising 60 to 90 parts starch, 1 to 9 parts leavening, 1 to 15 parts sugar, 1 to 15 parts salt, and 85% to 200% water based on the weight of the dry ingredients in said batter.

2. The method of claim 1 wherein the starch in said powder coating and batter is in the form of a farinaceous flour.

3. The method of claim 1, wherein the starch in said powder coating and in said batter comprises 40 to 50 parts of wheat flour and 30 to 40 parts of corn flour.

4. The method of claim 1, wherein a fraction of up to 5% of said starch is gelatinized.

5. The method of claim 1, wherein said powders and batters contain up to 5 parts of non-fat dry milk solids.

6. The method of claim 1, including the application to said batter coating of a second coating of a relatively dry powder containing starch and leavening and thereafter applying to said second dry powder coating a second coating of a batter containing starch and leavening.

7. The method of claim 6, wherein said starch is in the form of a flour comprising wheat flour and corn flour.

References Cited

UNITED STATES PATENTS

| | | | |
|---|---|---|---|
| 3,052,545 | 9/1962 | Ducharme et al. | 99—94 XR |
| 3,078,172 | 2/1963 | Libby | 99—192 |
| 3,235,385 | 2/1966 | Cull | 99—1 |
| 3,282,460 | 11/1966 | Boznango. | |

RAYMOND N. JONES, Primary Examiner